(12) United States Patent
Ciampolini et al.

(10) Patent No.: US 8,076,817 B2
(45) Date of Patent: Dec. 13, 2011

(54) ELECTRIC MOTOR WITH BAR WINDING AND CONNECTION PLATES

(75) Inventors: Franco Ciampolini, Bologna (IT); Augusto Eugenio Michele Maria Guccione, Arona (IT); Egidio D'Alpaos, Pieve D'Alpago (IT); Paolo Lissoni, Concorezzo (IT)

(73) Assignee: Magneti Marelli S.p.A., Corbetta (IT)

( * ) Notice: Subject to any disclaimer, the term of this patent is extended or adjusted under 35 U.S.C. 154(b) by 205 days.

(21) Appl. No.: 12/429,060

(22) Filed: Apr. 23, 2009

(65) Prior Publication Data

US 2010/0045134 A1 Feb. 25, 2010

(30) Foreign Application Priority Data

Apr. 24, 2008 (EP) .................................... 08425289

(51) Int. Cl.
*H02K 3/12* (2006.01)
*H02K 11/00* (2006.01)
(52) U.S. Cl. ........... 310/201; 310/208; 310/71; 903/906
(58) Field of Classification Search .................... 310/71, 310/201, 208, 179, 195; *H02K 3/04*
See application file for complete search history.

(56) References Cited

U.S. PATENT DOCUMENTS

| 5,623,178 | A | * | 4/1997 | Kawabata et al. | 310/260 |
|---|---|---|---|---|---|
| 5,828,147 | A | * | 10/1998 | Best et al. | 310/71 |
| 6,011,339 | A | * | 1/2000 | Kawakami | 310/208 |
| 6,208,056 | B1 | * | 3/2001 | Perkins | 310/179 |
| 6,300,697 | B1 | * | 10/2001 | Findeisen et al. | 310/68 B |
| 6,555,941 | B1 | * | 4/2003 | Zepp et al. | 310/191 |
| 6,710,496 | B2 | * | 3/2004 | Fujita et al. | 310/201 |
| 7,224,095 | B2 | * | 5/2007 | Chen | 310/190 |
| 7,936,116 | B2 | * | 5/2011 | Asou et al. | 310/410 |
| 2004/0189127 | A1 | | 9/2004 | Kobayashi et al. | |
| 2005/0023910 | A1 | * | 2/2005 | Lukenich | 310/71 |
| 2005/0189833 | A1 | | 9/2005 | Liao | |

(Continued)

FOREIGN PATENT DOCUMENTS

DE 4234175 A1 4/1994

(Continued)

OTHER PUBLICATIONS

European PO; search report in foreign application (EP 08425290.7) to which priority is claimed by U.S. Appl. No. 12/429,026 which is related to the present application; Dec. 16, 2008.

(Continued)

*Primary Examiner* — Quyen Leung
*Assistant Examiner* — Thomas Truong
(74) *Attorney, Agent, or Firm* — Workman Nydegger

(57) ABSTRACT

A multiphase synchronous electrical machine for converting kinetic energy into electrical energy and electrical energy into kinetic energy has a rotor extending along an axis, and a stator, which is provided with a stator pack having slots and with an electrical winding, which extends in part in the slots and in part in a position corresponding to two heads arranged on opposite sides of the stator pack and has bars housed in the slots and connected to one another in a position corresponding to the heads and connection plates, which are welded to the bars, are packed with respect to one another and to the stator pack in an axial direction and are shaped in such a way as to define a prolongation of the stator pack.

19 Claims, 7 Drawing Sheets

U.S. PATENT DOCUMENTS

| | | | |
|---|---|---|---|
| 2006/0181165 A1* | 8/2006 | Baenziger et al. | 310/71 |
| 2007/0251748 A1* | 11/2007 | Downs et al. | 180/243 |
| 2009/0102309 A1* | 4/2009 | Kamibayashi et al. | 310/195 |
| 2010/0045133 A1 | 2/2010 | Ciampolini et al. | |

FOREIGN PATENT DOCUMENTS

| | | |
|---|---|---|
| EP | 1168574 A2 | 1/2002 |
| GB | 1038011 | 8/1966 |
| WO | 92/11682 | 7/1992 |
| WO | 2007/108552 A1 | 9/2007 |

OTHER PUBLICATIONS

European PO; search report in foreign application (EP 08425289.9) to which priority is claimed by the present application; Oct. 10, 2008.

U.S. Appl. No. 12/429,026, filed Jan. 31, 2011, Office Action.

U.S. Appl. No. 12/429,026, filed Aug. 23, 2011, Notice of Allowance.

* cited by examiner

ELECTRIC MOTOR WITH BAR WINDING AND CONNECTION PLATES

CROSS REFERENCE TO RELATED APPLICATION

This application is related to the following: U.S. patent application Ser. No. 12/429,026 filed Apr. 23, 2009.

The present invention relates to a multiphase synchronous electrical machine for converting kinetic energy into electrical energy and electrical energy into kinetic energy on board a transport vehicle.

In particular, the present invention relates to a three-phase synchronous electrical machine, which comprises a rotor extending along an axis, a stator provided with a stator pack having slots and with an electrical winding, which extends in part in the slots and in part in a position corresponding to two heads arranged on opposite sides of the stator pack and comprises bars housed in the slots and connected to one another in a position corresponding to the heads.

BACKGROUND OF THE INVENTION

The use of electrical machines of the type identified above finds increasingly widespread application in transport vehicles, in particular, in transport vehicles equipped with an internal-combustion engine and in which the electrical machines have the function of generating electrical energy during braking of the transport vehicle and of converting the electrical energy into motive force in given operating conditions. These transport vehicles are generally defined as hybrid vehicles or hybrid-propulsion vehicles.

The process of conversion of kinetic energy into electrical energy and of electrical energy into kinetic energy requires installation on board the motor vehicle of an additional system known as KERS (Kinetic Energy Recovery System), which comprises, in addition to the electrical machine of a reversible type, a unit for accumulation of the electrical energy, and a control unit connected to the electrical machine and to the accumulation unit.

Said additional system, albeit providing encouraging results from the standpoint of the reduction of consumption and pollutants, in effect, increases the weight and the overall dimensions of the transport vehicle, and in many cases the application of said type of additional system is still limited.

SUMMARY OF THE INVENTION

An aim of the present invention is to provide a multiphase synchronous electrical machine for converting kinetic energy into electrical energy and electrical energy into kinetic energy on board a transport vehicle that will be free from the drawbacks of the known art.

Furthermore, an aim of the present invention is to provide a multiphase synchronous electrical machine for converting kinetic energy into electrical energy and electrical energy into kinetic energy on board a transport vehicle with very high power/weight ratio and power/volume ratios.

In accordance with said aims, a multiphase synchronous electrical machine is provided for converting kinetic energy into electrical energy and electrical energy into kinetic energy on board a transport vehicle, the electrical machine comprising a rotor extending along an axis, a stator provided with a stator pack having slots set parallel to the axis and with an electrical winding, which extends in part in the slots and in part in a position corresponding to two heads arranged on opposite sides of the stator pack and comprises bars housed in the slots and connected to one another in a position corresponding to the heads, the electrical machine being characterized in that the electrical winding comprises connection plates, which are welded to the bars, are packed with respect to one another and to the stator pack in an axial direction, and are shaped in such a way as to define an axial prolongation of the stator pack.

In this way, the electrical winding is very compact and has connection plates having considerable dimensions that enable provision of relatively large joining surfaces between the bars and the connection plates.

The present invention moreover relates to a method for assembling a multiphase synchronous electrical machine for converting kinetic energy into electrical energy and electrical energy into kinetic energy on board a transport vehicle.

Provided according to the present invention is a method for assembling a multiphase synchronous electrical machine for converting kinetic energy into electrical energy and electrical energy into kinetic energy on board a transport vehicle, in which the electrical machine comprises a rotor extending along an axis, a stator provided with a stator pack having slots and with an electrical winding, which extends in part in the slots and in part in a position corresponding to two heads arranged on opposite sides of the stator pack and comprises bars housed in the slots and connected to one another in a position corresponding to the heads, the method being characterized in that connection plates are packed to one another and to the stator pack in an axial direction so as to define a prolongation of the stator pack and the connection plates are welded to the bars.

The present invention moreover regards a transport vehicle.

Provided according to the present invention is a transport vehicle comprising a supporting chassis and at least one wheel that can turn with respect to the chassis, the transport vehicle being characterized in that it comprises an electrical machine according to any one of Claims 1 to 10 coupled to said wheel.

BRIEF DESCRIPTION OF THE DRAWINGS

Further characteristics and advantages of the present invention will emerge clearly from the ensuing description of a non-limiting example of embodiment thereof, with reference to the figures of the annexed drawings, wherein.

DETAILED DESCRIPTION OF THE INVENTION

The Electrical Machine

Figure 1:
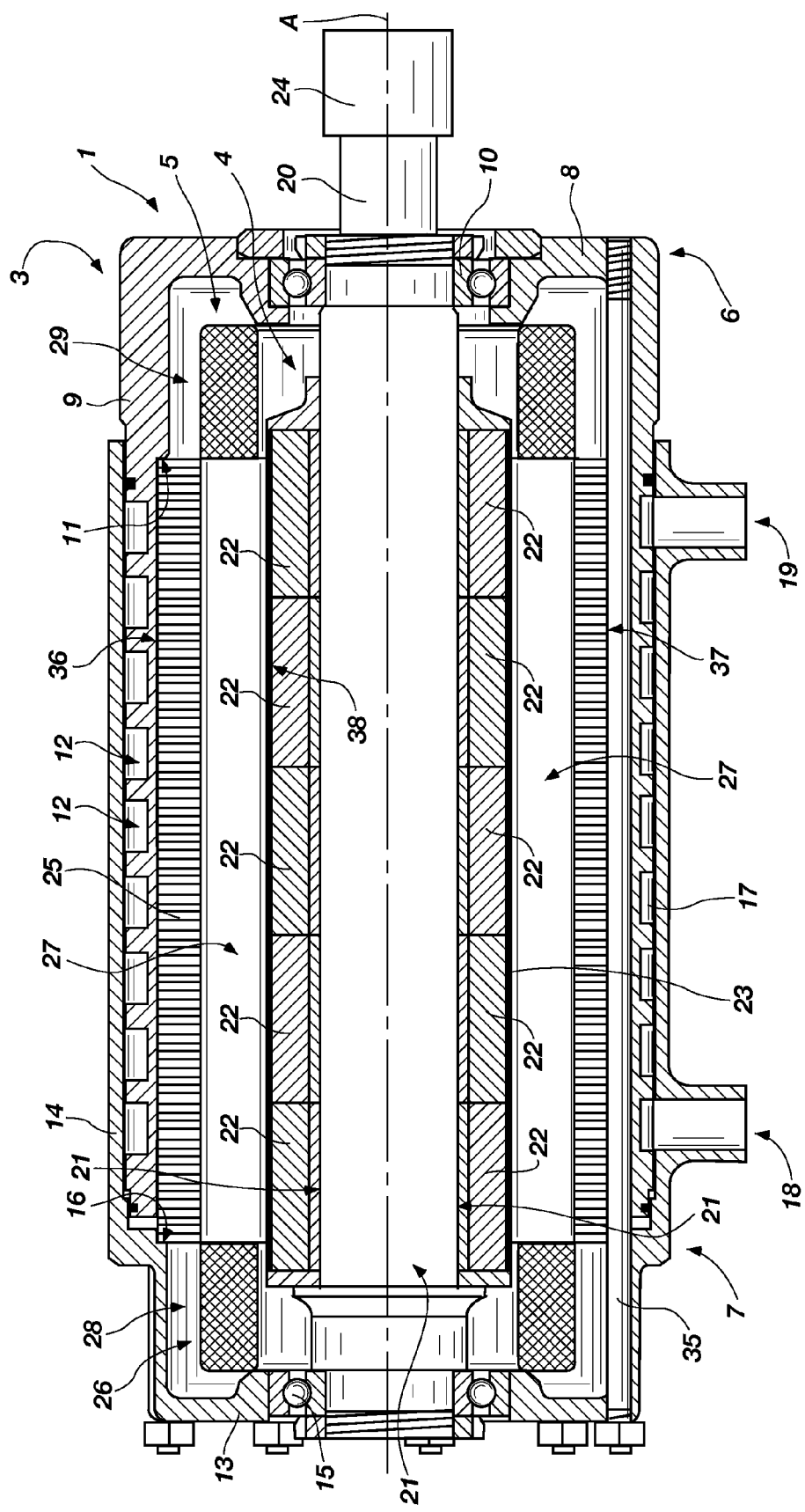
FIG. 1 is a longitudinal sectional view, with parts removed for reasons of clarity, of an electrical machine built in accordance with the present invention.
Figure 8:
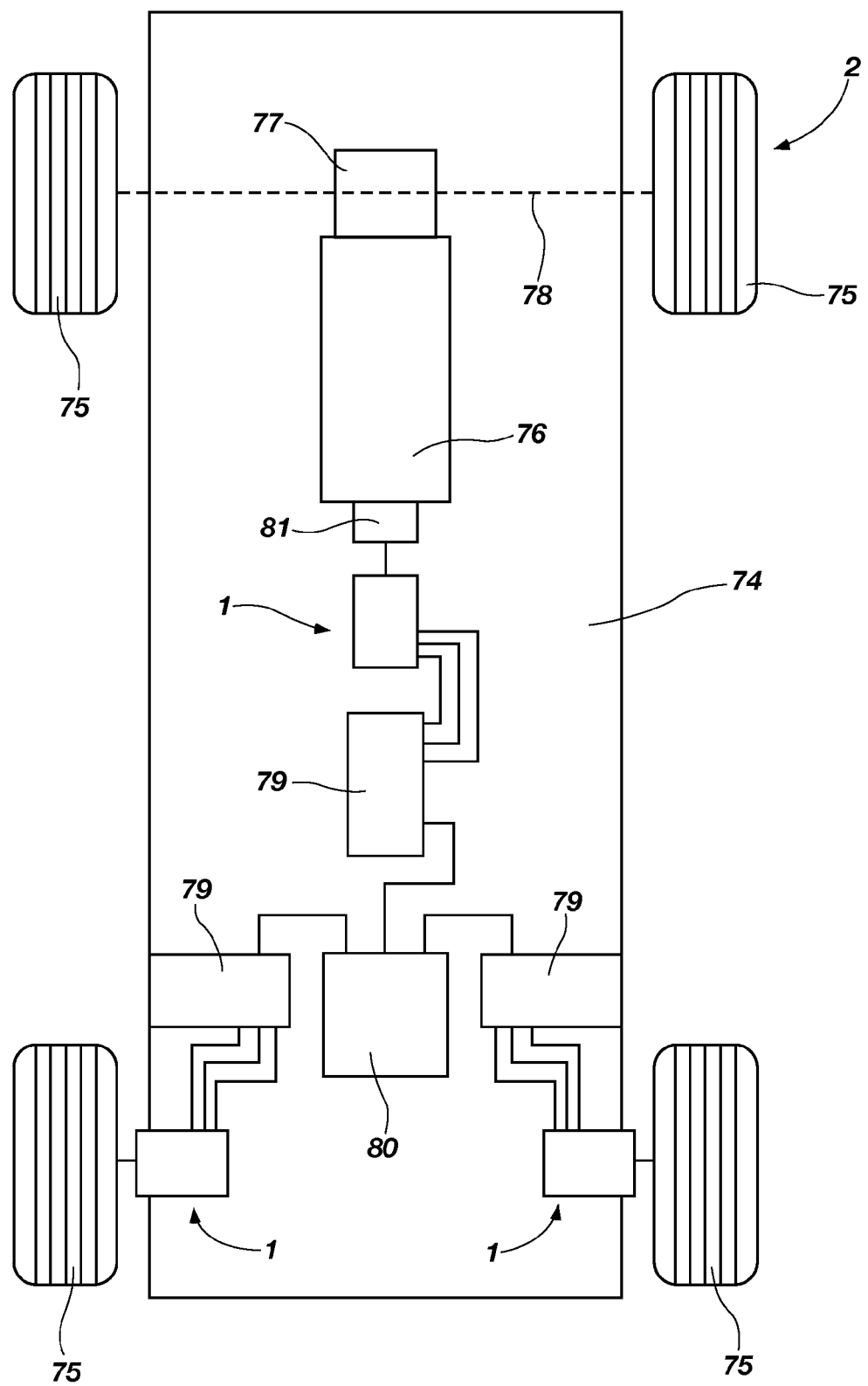
FIG. 8 is a schematic view, with parts removed for reasons of clarity, of a vehicle equipped with the electrical machine of FIG. 1.

In FIG. 1, designated as a whole by the reference number 1 is a multiphase synchronous electrical machine for converting kinetic energy into electrical energy and electrical energy into kinetic energy on board a transport vehicle 2 (FIG. 8).

In particular, the electrical machine 1 is a very compact reversible three-phase synchronous electrical machine capable of supplying a high power with respect to the weight of the electrical machine 1 itself. The electrical machine 1 has a substantially cylindrical shape, extends along an axis A, and is characterized in that it has an overall length greater than the diameter, in particular a length equal to approximately twice the diameter.

The electrical machine 1 comprises a supporting casing 3, a rotor 4 extending along the axis A, and a stator 5 set around the rotor 4.

The supporting casing 3 comprises two half-shells 6 and 7, fitted axially inside one another. The half-shells 6 and 7 have a substantially cylindrical shape and are assembled together around the rotor 4 and the stator 5. The half-shell 6 comprises an end flange 8, set perpendicular to the axis A, and a cylindrical wall 9 set parallel to the axis A. The flange 8 has a central hole for housing a bearing 10 for supporting the rotor 4, whilst the wall 9 has an internal shoulder 11, designed to be set bearing upon the stator 5, and an external helical groove 12.

The half-shell 7 comprises an end flange 13 set perpendicular to the axis A, and a cylindrical wall 14 set parallel to the axis A. The flange 13 has a central hole for housing a bearing 15 for supporting the rotor 4, whilst the wall 14 has an internal shoulder 16, designed to be set bearing upon the stator 5.

The wall 14 partially overlaps the wall 9 in a position corresponding to the external helical groove 12 so as to form a helical cooling chamber 17, and has a supply mouth 18 and an outlet mouth 19 designed to be connected, respectively, to a pipe for supply and a pipe for evacuation of coolant (not illustrated in the attached figures), in particular, a liquid coolant, which is conveyed along the helical cooling chamber 17 for cooling the stator 5.

The rotor 4 comprises a shaft 20, which is supported by the bearings 10 and 15 and comprises a central portion, made along which are plane faces 21, in a number equal to the number of poles of the electrical machine, and a plurality of permanent magnets 22, which are arranged in a number of rows along the plane faces 21 equal to the number of poles of the electrical machine. In the case in point, illustrated in FIG. 1, the permanent magnets 22 are arranged in four rows of five permanent magnets 22 each.

In general, each single row is moreover provided with a number of magnets arranged one after the other so as to limit the losses due to parasitic currents in the permanent magnets themselves.

Each permanent magnet 22 is preferably made of samarium-cobalt and is glued to a respective plane face 21. The rotor 4 comprises a tube 23 made of carbon fibre set around the permanent magnets 22 to prevent possible detachment of the permanent magnets 22 from the shaft 20.

According to an alternative embodiment (not illustrated in the attached figures), the tube 23 made of carbon fibre is omitted, and the rotor 4 comprises a Zylon® wire wound in a helix around the permanent magnets 22 so as to prevent detachment thereof.

The shaft 20 has one end set outside the supporting casing 3 and having a shank 24 for attachment to a gear or pulley (not illustrated in the attached figures). The rotor 4, in particular the active part thereof occupied by the permanent magnets 22, has a diameter sensibly smaller than the length of the rotor 4, in particular than the active part thereof, so as to limit the centrifugal forces and guarantee low inertia to rotation and a greater reaction to the change of r.p.m.

The stator 5 comprises a stator pack 25 and an electrical winding 26. The stator pack 25 is formed by a pack of laminations set perpendicular to the axis A and has axial slots 27, i.e., ones set parallel to the axis A.

According to an alternative embodiment (not illustrated in the attached figures), the axial slots are slightly inclined with respect to the axis by a so-called skew angle.

The electrical winding 26 comprises a first portion that extends within the slots 27 and a second portion that extends on the outside of the slots 27 and in the case in point is defined by two heads 28 and 29 set up against the opposite ends of the stator pack 25.

Figure 2:
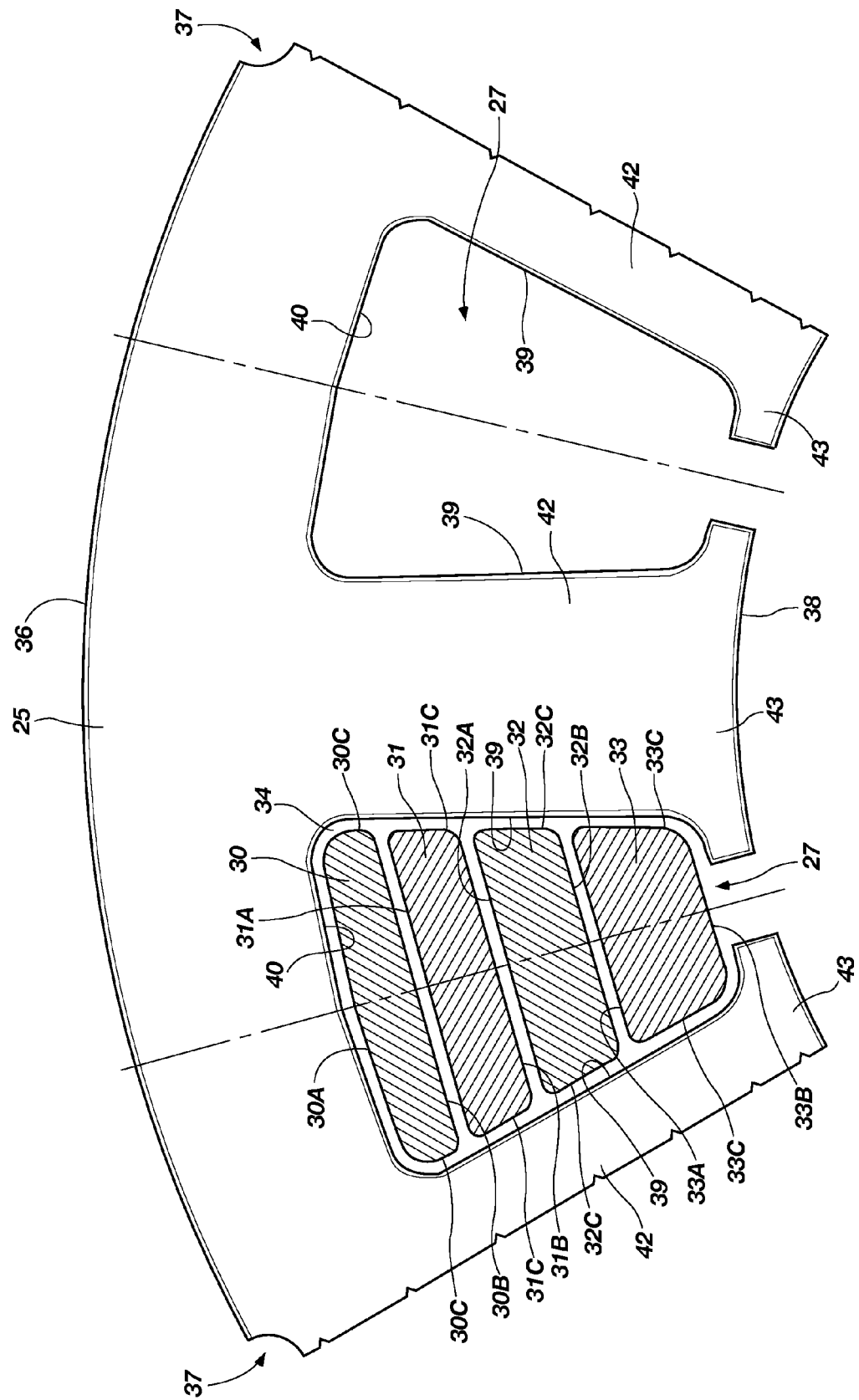
FIG. 2 is a view in front elevation at an enlarged scale, with parts removed for reasons of clarity, of a detail of the electrical machine of FIG. 1.

With reference to FIG. 2, the electrical winding 26 comprises conductive bars 30, 31, 32, 33, which are arranged in part in the slots 27 and in part in a position corresponding to the heads 28 and 29, in which the bars 30, 31, 32, 33 are connected to one another so as to define a given electrical scheme of the winding 26.

In the case in point, FIG. 2 illustrates a set formed by four bars 30, 31, 32, and 33 housed within a single slot 27. Basically each slot 27 is occupied by a set of four bars 30, 31, 32, 33.

Wound around each of the bars 30, 31, 32, and 33 is an insulating tape of material with high dielectric strength, and each bar is further insulated from the stator pack 25 and from the other bars 30, 31, 32, 33 by a resin impregnated in the stator pack 25.

In the case in point, the insulation is guaranteed by a tape of polyamide resin (KAPTON) capable of ensuring a dielectric strength higher than 270V/μm. Impregnation with the resin is performed once the entire electrical winding 26 has been completed and assembled on the stator pack 25. In FIG. 2, the resin and the insulating tape are designated as a whole by the reference number 34.

With reference to FIG. 1, the stator pack 25 is set bearing upon the shoulders 11 and 16, respectively, of the half-shells 6 and 7 and is gripped between the half-shells 6, 7, which are assembled by means of tie-rods 35 set parallel to the axis A.

Figure 3:
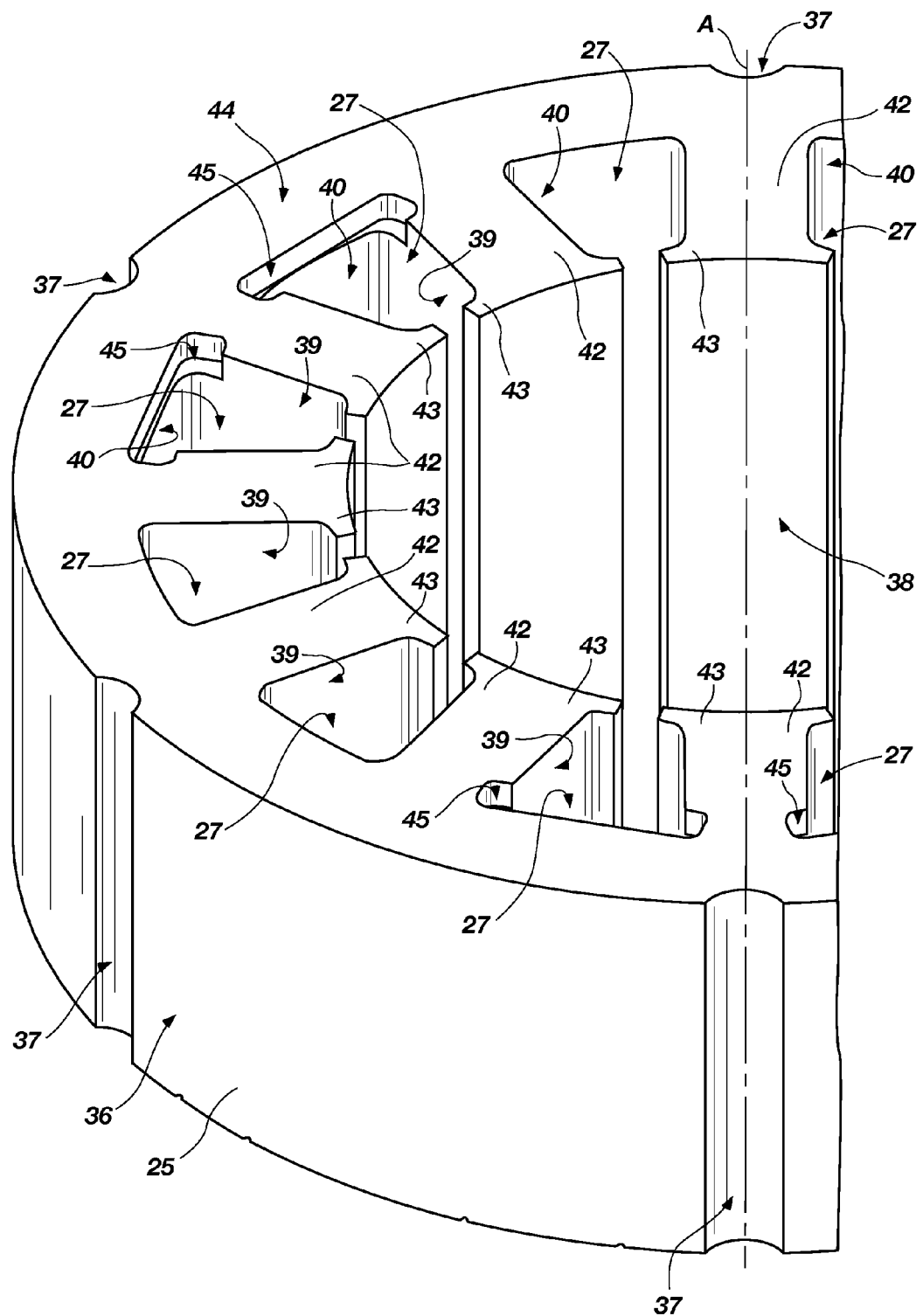
FIG. 3 is a perspective view, with parts removed for reasons of clarity and at an enlarged scale, of a component of the electrical machine of FIG. 1.

With reference to FIG. 3, the stator pack 25 has a substantially cylindrical shape, an outer surface 36 with grooves 37 set at intervals apart for housing the tie-rods 35, and an inner surface 38 interrupted by the twelve slots 27. It is understood that the number of slots 27 is a design parameter and, all the other characteristics being equal, the number of slots 27 can generally be chosen from any multiple of three.

Each slot 27 is delimited by two opposite, plane, side faces 39, converging towards the axis A, a bottom face 40 radiused to the side faces 39, and an opening 41 towards the axis A and towards which the side faces 39 are radiused. Two adjacent slots 27 are separated from one another by a diaphragm 42 that expands in a position corresponding to the opening 41 in a so-called polar expansion 43.

The stator pack 25 has two end faces 44 (just one of which is illustrated in FIG. 3) and, along said faces 44 and in a position corresponding to some slots 27, undercuts 45 defining respective seats, which are designed to enable insertion of respective tabs of insulating material for insulating the bars 30 after welding thereof in a position corresponding to the heads 28 and 29 (FIG. 1).

With reference to FIG. 2, each slot 27 has a cross section substantially shaped like an isosceles trapezium, in which the bottom face 40, even though it is slightly arched, represents the major base, the opening 41 basically defines the minor base, and the side faces 39 define the inclined sides of the isosceles trapezium.

The bars 30, 31, 32, and 33 of one and the same set of bars set in a slot 27 have respective cross sections having a shape and dimensions different from one another.

In greater detail, the bar 30 has a face 30A facing the bottom face 40, a face 30B, and two inclined faces 30C. The bar 30 is characterized by having a flattened shape: the height of the bar 30 measured in a radial direction, i.e., the height of the cross section of the bar 30, is sensibly smaller than the width of the face 30A and even less than half of the width of the face 30A.

The bar 31 has a face 31A facing the face 30B, a face 31B, and two inclined faces 31C. The bar 31 has a sturdier appearance as compared to the bar 30 and has a height greater than that of the bar 30.

The bar 32 has a face 32A facing the face 31B, a face 32B, and two inclined faces 32C. The bar 32 has a sturdier appearance as compared to the bar 31 and has a height (measured in a radial direction) greater than the height of the bar 31.

The bar 33 has a face 33A facing the face 32B, a face 33B facing the opening 41, and two inclined faces 33C. The bar 33 has a particularly elongated appearance: the height in a radial direction is greater than half the width of the face 33A and greater than the height of the bar 32.

In general, the bars 30, 31, 32, and 33 have an increasing height starting from the bottom face 40 towards the opening 41 and at the same time have an average width that decreases starting from the bottom face 40 towards the opening 41.

The sizing of the bars 30, 31, 32 and 33 of each set substantially enables the inclined faces 30C, 31C, 32C and 33C to be kept aligned and a cross section of the same shape and substantially complementary to the cross section of the slot 27 to be thus defined for each set of bars 30, 31, 32, and 33.

In particular, the inclined faces 30C, 31C, 32C, 33C of each bar 30, 31, 32, 33 are set facing and parallel to a respective side face 39 of the slot 27.

Furthermore, the face 30A is set parallel to the bottom face 40, whilst the faces 31A, 32A, 33A, and the faces 30B, 31B, 32B, 33B, of each bar 30, 31, 32, 33, are set parallel to one another.

The only difference between the cross section of the set of bars 30, 31, 32 and 33 and the cross section of the slot 27 is determined by the inevitable presence of the insulating material 34, which must be set between the bars 30, 31, 32 and 33 and the inclined faces and the bottom face 40 of the slot 27, and in any case the gap occupied by the insulating material is of the order of a few tenths of a millimetre, the representation in FIG. 2 being at a very enlarged scale.

The shape of the bars 30, 31, 32 and 33 and their arrangement in the slot 27 enable a filling of the slot 27 that is much better than that of the known art, with values of up to ninety-five per cent, which guarantees a very high efficiency of the electrical machine 1.

At the same time, the progressive increase of the height of the bars 30, 31, 32 and 33 and the reduction of the average width thereof in a radial direction towards the axis A guarantees an efficient heat exchange also for the innermost bars 32 and 33 and consequently increases the efficiency and performance of the electrical machine 1. To enable a clearer understanding of this statement, it should be recalled that the cooling chamber 17 delimited by the half-shells 6 and 7 is basically in contact with the stator pack 25 along the outer surface 36 thereof. Consequently, the stator pack 25 has an increasing thermal gradient starting from the outer surface 36 towards the inner surface 38. It follows that the bars 32 and 33 closer to the inner surface 38 are at a disadvantage as regards the thermal jump, which is a fundamental parameter that regulates heat exchange. For this reason, the progressive increase of the height and the reduction of the average width of the bars 30, 31, 32, 33 enables faces 30C, 31C, 32C, 33C to be defined that increase towards the thermally unfavoured areas of the stator pack 25, and a satisfactory heat exchange to be provided also in those areas.

Figure 4:
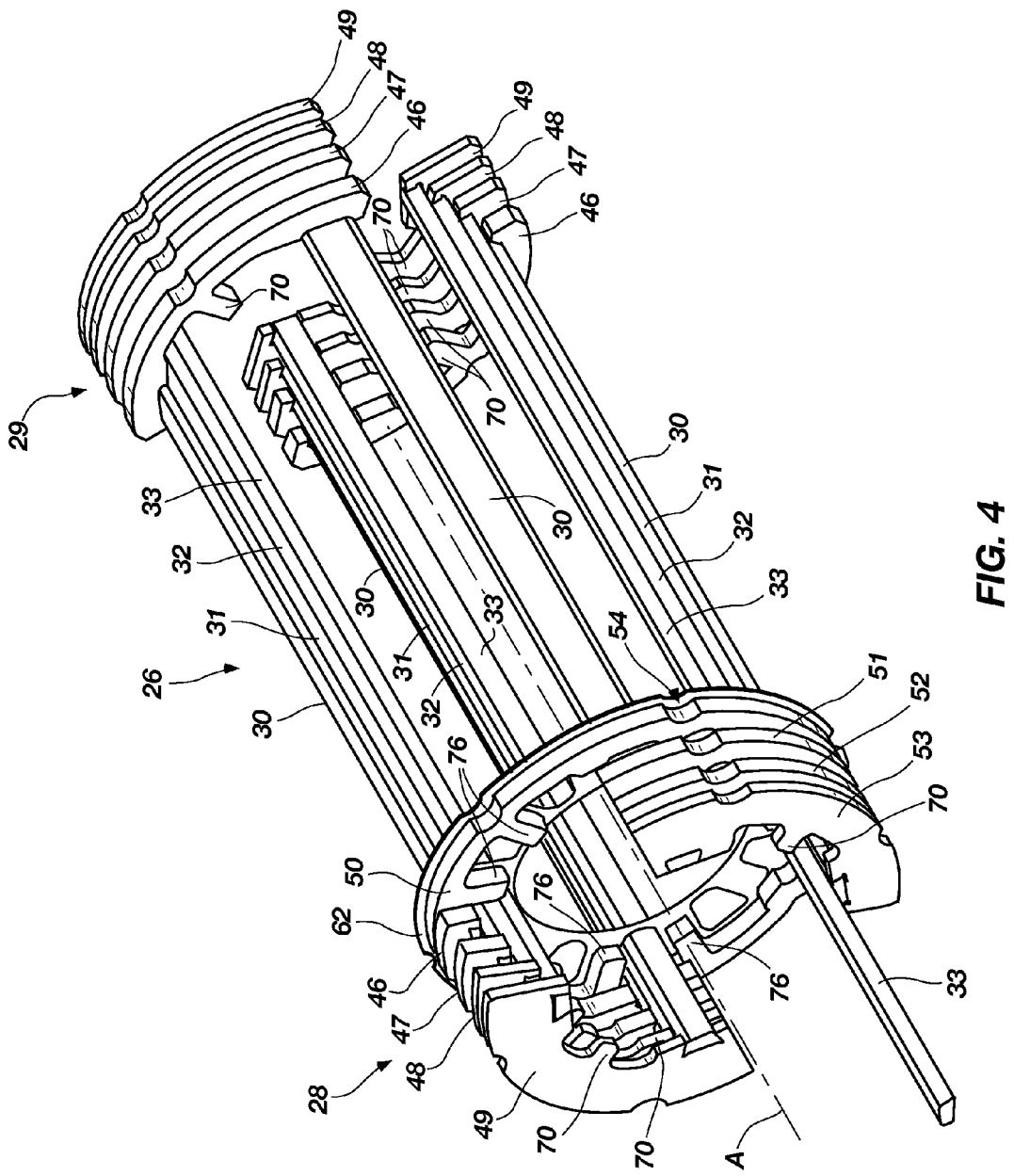
FIG. 4 is a perspective view, with parts removed for reasons of clarity, of a component of the electrical machine of FIG. 1.

With reference to FIG. 4, for reasons of greater clarity the electrical winding 26 is illustrated only in part and with reference to just one of the three phases that characterize said electrical winding 26.

As illustrated in FIG. 4, the bars 30, 31, 32 and 33 of one and the same phase are connected to one another in a position corresponding to the two heads 28 and 29 to define a given electrical arrangement of one of the three phases of the electrical machine 1. For each phase, the head 29 comprises eight connection plates 46, 47, 48 and 49, each of which is connected to two of the bars 30, 31, 32 and 33.

The head 28 comprises: an annular connection plate 50, which is common to all three phases and is designed to be connected to three bars 30 (just one of which is illustrated in FIG. 4) of three different phases and defines the star centre of the electrical machine 1; four connection plates 46, 47, 49 and 50, each of which is connected to two of the bars 30, 31, 32 and 33; and three connection plates 51, 52, 53, each of which is connected to two of the bars 30, 31, 32, 33.

In the case in point, each connection plate 46 is connected to two bars 30 of the same phase; each connection plate 47 is connected to two bars 31 of the same phase; each connection plate 48 is connected to two bars 32 of the same phase; and each connection plate 49 is connected to two bars 33 of the same phase.

The connection plate 51 is connected to a bar 30 and to a bar 31 of the same phase; the connection plate 52 is connected to a bar 31 and to a bar 32 of the same phase; and the connection plate 53 is connected to a bar 32 and to a bar 33 of the same phase.

A bar 33 extends axially beyond the connection plate 52 and is connected to a terminal of the electrical machine 1 (not illustrated in the attached figures).

Figure 5:
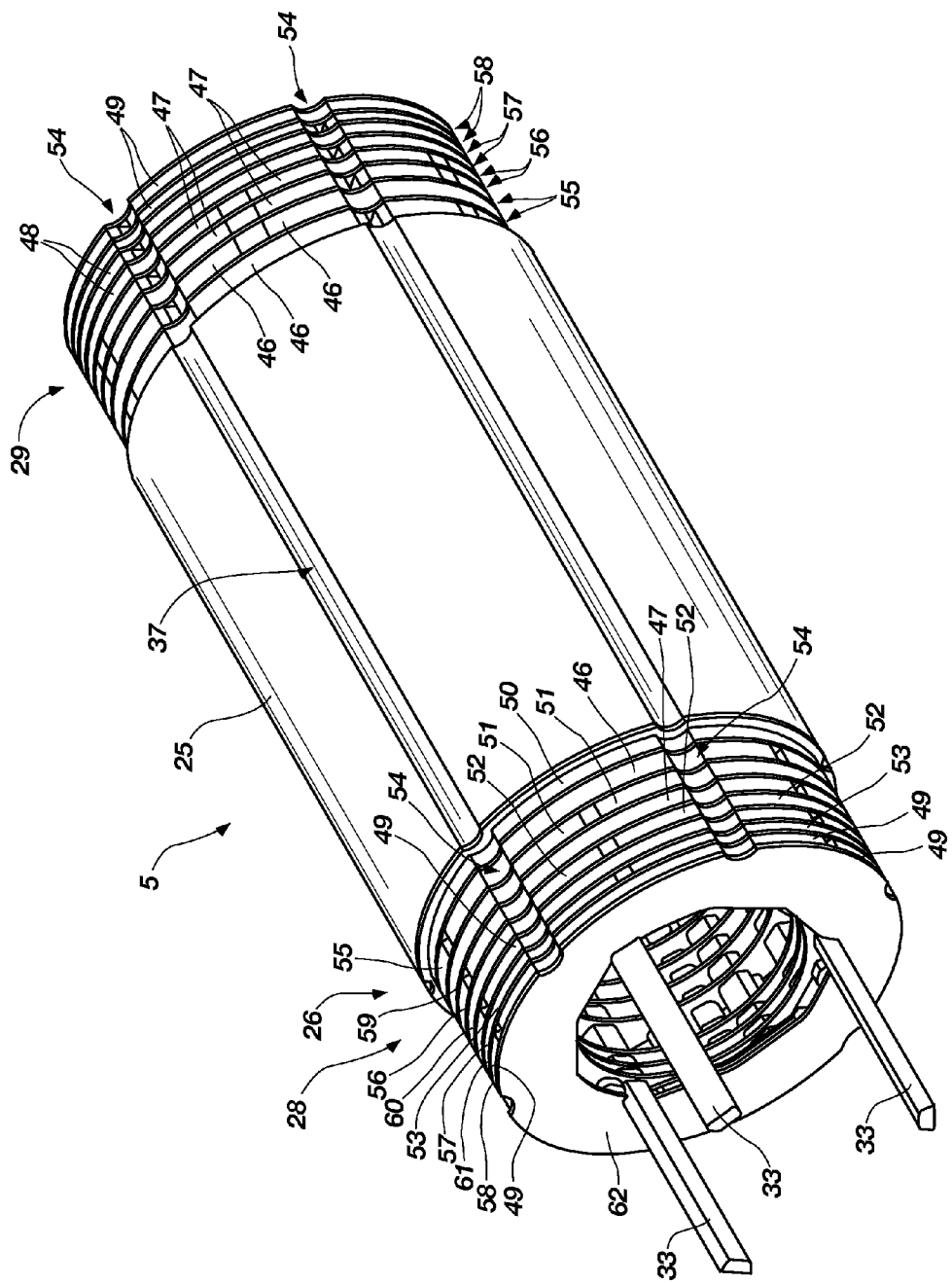
FIG. 5 is a perspective view, with parts removed for reasons of clarity and at an enlarged scale, of a further component of the electrical machine of FIG. 1.

With reference to FIG. 5, the stator pack 25 is provided with the electrical winding 26.

In the case in point, the head 29 is formed by the connection plates 46, 47, 48 and 49, packed with respect to one another and against the face 44 (FIG. 3) of the stator pack 25, and the head 28 is formed by the connection plates 46, 47, 48, 49, 51, 52 and 53 and by the annular connection plate, packed with respect to one another and to the face 44 (FIG. 3) of the stator pack 25.

All the connection plates 46, 47, 48, 49, 51, 52 and 53 share the common characteristic of having a shape like the arc of a circle, an external profile having a radius equal to the external radius of the stator pack 25, and have grooves 54 that are identical as regards cross section and angular position about the axis A to the grooves 37 of the stator pack 25 so as to define the prolongation of the grooves 27 and house the tie-rods 35 (FIG. 1).

Furthermore, all the connection plates 46, 47, 48, 49, 51, 52 and 53 share the common characteristic of extending about the axis A for approximately 120° so that three of the connection plates 46, 47, 48, 49, 51, 52, 53 lying in the same plane transverse to the axis A and arranged about the axis A substantially define a ring.

In effect, the head 29 comprises, in succession, starting from the stator pack 25 two rings 55, each of which is formed by three connection plates 46, two rings 56, each of which is formed by three connection plates 47, two rings 57, each of which is formed by three connection plates 48, and two rings 58, each of which is formed by three connection plates 49.

Likewise, the head 28 comprises, in succession, starting from the stator pack 25, one annular connection plate 50, one ring 55 formed by three connection plates 46, one ring 59 formed by three connection plates 51, one ring 56 formed by three connection plates 47, one ring 60 formed by three connection plates 52, one ring 57 formed by three connection plates 48, one ring 61 formed by three connection plates 52, and one ring 58 formed by three connection plates 49.

In this way, the connection plates 46, 47, 48, 49, 50, 51, 52, 53 are packed to the stator pack 25 and to one another, and are shaped so as to define the prolongation of the stator pack 25, in particular the prolongation of the outer face 36.

As described previously, the angular extension of the connection plates 46, 47, 48, 49, 51, 52 and 53 is slightly smaller than 120° so that the connection plates 46, 47, 48, 49, 51, 52 and 53 lying in the same plane to define the rings 55, 56, 57, 58, 59, 60 and 61 are spaced apart by the respective adjacent connection plates 46, 47, 48, 49, 51, 52 and 53 in a circumferential direction. The gaps that derive therefrom are then filled with resin in the step of impregnation described previously.

With reference to FIG. 4, the annular connection plate 50 is separated from the stator pack 25 by an insulating sheet 62. Likewise, each ring 55, 56, 57, 58, 59, 60 and 61 is separated from an adjacent ring 55, 56, 57, 58, 59, 60 and 61 by an insulating sheet (not illustrated in the attached figures), and has characteristics similar to those illustrated with reference to the sheet 62.

Figure 6:
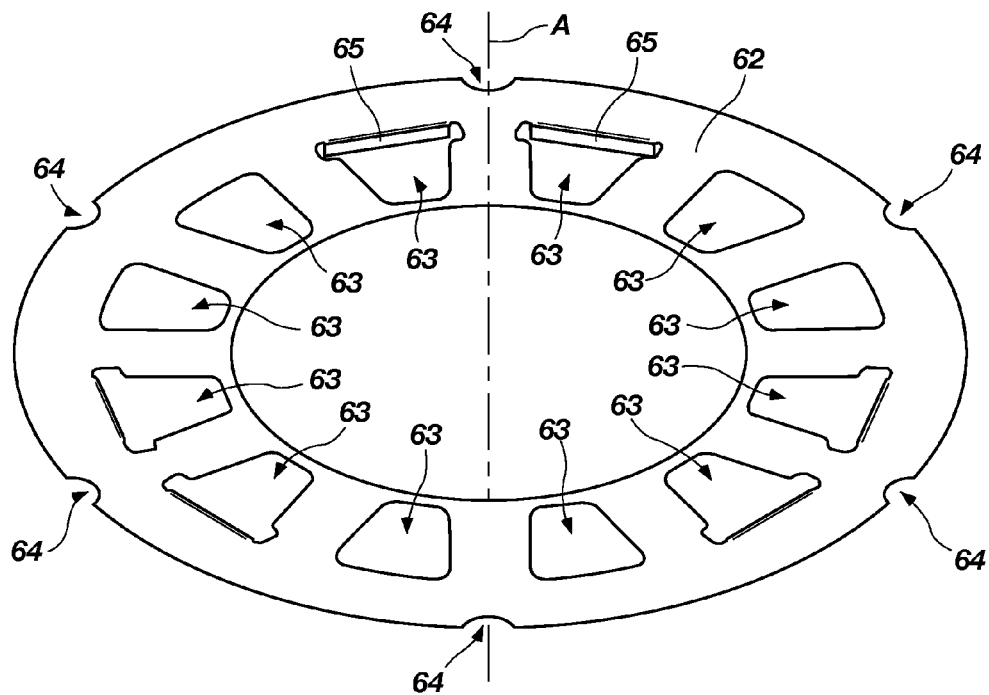
FIG. 6 is a perspective view, with parts removed for reasons of clarity, of a detail of the electrical machine of FIG. 1.

In greater detail and with reference to FIG. 6, each sheet 62 has the shape of a ring and comprises openings 63 uniformly distributed along the sheet 62, in the case in point, twelve openings 63, and six notches 64, which are arranged along the outer profile. Each notch 64 is aligned to a groove 37 (FIG. 5) and to a groove 54. Each opening 63 is sized so as to enable passage of a set of bars 30, 31, 32 and 33 or, as in the case of the sheet 62 of FIG. 5, of a single bar 33. Clearly, the opening 63 can assume shapes and dimensions different for each insulating sheet 62 according to the number and the type of bars 30, 31, 32, 33 that pass through the opening 63. Also the number of openings 63 can vary from a maximum of twelve (FIG. 6) to a minimum of three (FIG. 5).

With reference to the sheet 62 of FIG. 6, six of the twelve openings 63 have a cross section that is larger at the outer edge of the opening 63 and corresponds to the end cross section of the slots 27 provided with the undercut 45 (FIG. 3). Each of the six openings 63 with oversized section is provided with a tab 65, set parallel to the axis A and in a position corresponding to the outer edge of the opening 63, and is designed to engage the undercut 45 (FIG. 3) in particular the bottom face of the undercut 45.

Figure 7:
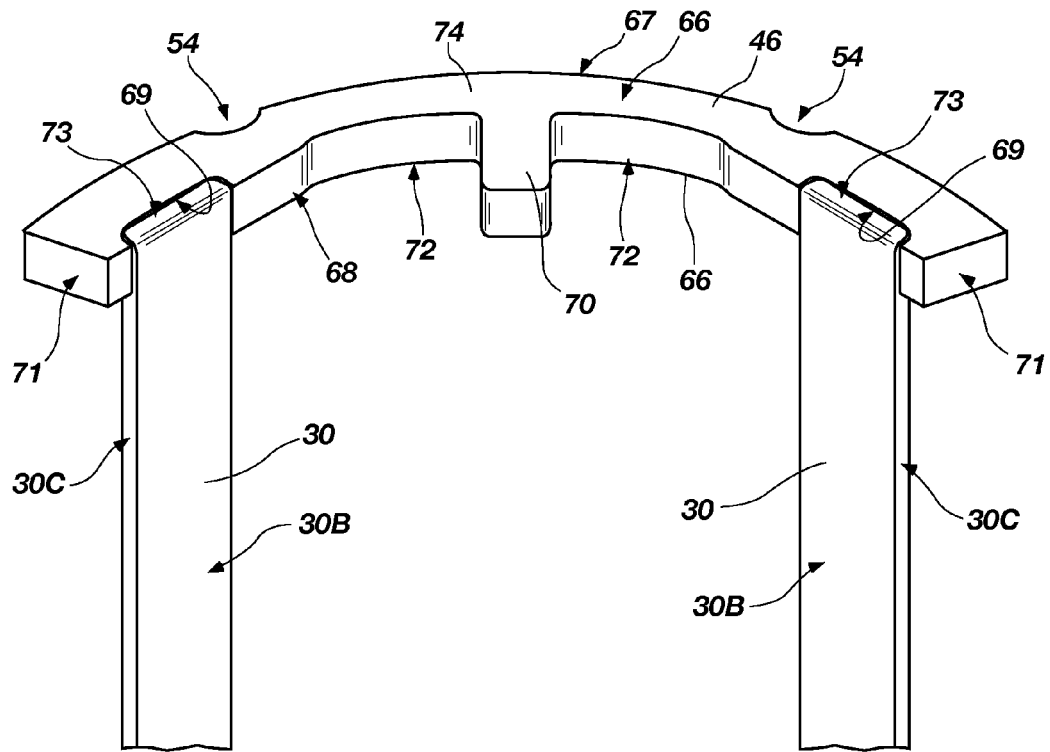
FIG. 7 is a perspective view, at an enlarged scale and with parts removed for reasons of clarity, of a further detail of the electrical machine of FIG. 1.

With reference to FIG. 7, a connection plate 46 is welded to two bars 30. The connection plate 46 has two plane faces 66, a curved outer face 67, made along which are two grooves 54, and an inner face 68, made along which are two seats 69 for housing two respective bars 30.

The connection plate 46 moreover comprises an arm 70 that extends radially between the two seats 69 and two end faces 71.

Each seat 69 extends in a position corresponding to a face 30A and two inclined faces 30C of each bar 30. The bar 30 is welded to the connection plate 46 in a position corresponding to the seat 69 with an electrical-resistance welding technique. Consequently, a portion of the face 30A and of the inclined faces 30C is welded to the connection plate 46 along the entire extension of the seat 69 by localized melting of the material defining the connection plate 46 and the bar 30.

According to one variant the welding technique envisages the application of molten material, in particular, a silver alloy.

According to a further variant (not illustrated), the welding technique envisages the use of localized and convergent laser beam.

The connection plate 46 has a constant thickness equal to the distance between the side faces 66, and a height that is variable in a radial direction, it being maximum in the proximity of the seats 69 and minimum at the side of the arm 70. In effect, the connection plate 46 has two compartments 72 arranged on opposite sides of the arm 70 and designed to enable passage of two bars 30 without any contact with the connection plate 46 and designed to be welded to respective connection plates 46 or 51. Furthermore, the inner face 68 in a position corresponding to said compartments 72 is designed to be set in contact with two respective tabs 65 of a sheet 62.

In addition, the bar 30 has an end face 73, which is set flush with one of the side faces 66. In general, each of the bars, 30, 31, 32, 33 has a length such as to be set flush with a respective face 66 of a connection plate 46, 47, 48, 49, 50, 51, 52, 53.

The structural characteristics defining the connection plate 46 are substantially valid also for the connection plates 47, 48, 49, 51, 52 and 53, with some variations of a dimensional nature.

For instance, the connection plates 47 have a radial height greater than the height of the connection plates 46 because, keeping the same dimension of the external face 67, they are designed to connect two bars 31 arranged radially towards the inside with respect to the bars 30, and must enable passage of the bars 31, 32, and 33. The connection plates 47 are thinner, in an axial directions than the connection plates 46 in such a way as to compensate for the greater extension in a radial direction of the connection plates 47 with respect to the connection plates 46 and so that the mass of conductive material of the connection plates 46 and 47 will be the same. The same criterion is applied to all the connection plates 46, 47, 48, 49, 51, 52 and 53: the connection plates 48 have a radial height greater than the height of the connection plates 47 and are hence axially thinner than the connection plates 47. The same applies to the connection plates 49, which have a greater radial height and a smaller thickness than the connection plates 48.

Similar sizes also apply to the connection plates 51, 52, 53, which, unlike the connection plates 46, 47, 48 and 49, present a slight asymmetry owing to the fact that said connection plates 51, 52, 53 provide asymmetrical connections, i.e., between the bars 30, 31, 32 and 33 that occupy different positions in the slots 27. Consequently, each connection plate 51, 52 and 53 will have a different radial height in a position corresponding to its own seats 69.

In general, the thickness of the connection plates 46, 47, 48, 49, 50, 51, 52, 53 decreases starting from the stator pack 25 towards the outside, whilst the average height of the connection plates 46, 47, 48, 49, 50, 51, 52, 53 increases starting from the stator pack 25.

The Methods of Assembly

Assembly of the electrical machine 1 is now described with particular reference to assembly of the stator 5.

Basically, three bars 30 wound with insulating tape are inserted in three respective slots 27 provided with undercut 45 of the stator pack 25 of FIG. 3. The slots 27 are arranged at 120° from one another, and the bars 30 extend with respect to a face 44 by a length equal to the thickness of the annular connection plate 50. Set on the aforesaid face 44 is an insulating sheet 62 (FIG. 6), the tabs 65 of which are inserted in the undercuts 45 to prevent the possible burning of the insulating tape in the proximity of the annular connection plate 50 during welding. Next, the annular star-centre connection plate 50 is welded to the three bars 30 care being taken to make sure that the end face 73 of each bar 30 is flush with the side face 66 of the annular connection plate 50. Once welding is completed, the annular connection plate 50 is packed against the face 44, gripping, in between, the insulating sheet 62, and the bars welded thereto are inserted in respective slots. In this assembly step, the tabs 65 are preliminarily inserted within the respective undercuts 45.

Along the opposite face 44 of the stator pack 25, an insulating sheet 62 is set in contact with the face 44, the tabs 65 being set within the respective undercuts 45, and the three bars 30 are welded to three respective connection plates 46, which are arranged packed against the face 44 of the stator pack 25 gripping the insulating sheet 62 (FIG. 6) and are arranged about the axis A so as to form a ring 55. Clearly, the length of the bars 30 is selected in such a way that the end faces 73 are flush with the free lateral surfaces 66 of the three connection plates 46. Also in this case, welding is performed in a position corresponding to the seats 69 (FIG. 7). Next, three bars 30 having a length greater than that of the first three bars 30 are inserted in the slots 27 and are welded to the connection plates 46 of the ring 55.

After interposing an insulating sheet 62, the three bars 30 are welded to three connection plates 46, packed to the annular star-centre connection plate 50 so as to grip the insulating sheet 62 between the connection plates 46 defining the ring 55 and the annular connection plate 50. The new three bars 30 are welded to the connection plates 46 with the modalities described previously. Next, three further bars 30, which are welded to the connection plates 46, are inserted in the heads 28 and are welded to new connection plates 46 in the heads 29 after insertion of an insulating sheet 62. The subsequent insertion of three bars 30 complete the insertion of the bars 30. The last three bars 30 inserted in order of time are welded to connection plates 46 in the heads 29, whilst in the heads 28 they are welded to the connection plates 51 after insertion of an insulating sheet 62.

The insertion of the components of the winding 26 proceeds in the way described previously.

Some steps of a particularly advantageous method of assembly of the stator 5 are summed up below:

1) obtaining a subassembly comprising an annular star-centre 3 connection plate 50 and a number of bars 30 equal to the number of the phases via welding;

2) setting two insulating sheets 62 on the two faces 44 of the stator pack 25 and then inserting the bars 30 of the subassembly identified in point 1) in the slots 27;

3) obtaining fork-shaped subassemblies, each of which comprises a connection plate 46, and two bars 30 via welding (FIG. 7);

4) obtaining fork-shaped subassemblies, each of which comprises a connection plate 51, a bar 30, and a bar 31;

5) inserting the fork-shaped subassemblies referred to in point 3), making sure that between the second bar 30 of the first fork-shaped subassembly and the first bar 30 of the second fork-shaped subassembly there are present two separation slots 27 for each phase.

6) proceeding in a clockwise or counterclockwise direction on the same side of the stator pack, and inserting all the forks and last of all the one with bars different from one another;

5) connecting, by welding bridges 46, the free ends of the bars 30 in a position corresponding to the heads 28 and 29;

6) repeating the above steps starting from point 2) replacing in sequence the bar 30 with the bar 31, 32, 33, the connection plate 46 with the connection plates 47, 48, 49, and the connection plate 51 with the connection plates 52 and 53.

This procedure for assembling the electrical winding 26 has the peculiarity of enabling provision of a high number of welds between the bars 30, 31, 32, 33 and the connection plates 46, 45, 46, 47, 48, 49, 50, 51, 52, 53 prior to insertion of the bars 30, 31, 32, 33 in the respective slots 26, thus facilitating welding.

According to an alternative procedure, the same assembly operations can be performed as follows:

1) obtaining and inserting a subassembly formed by the annular connection plate 50 and three bars 30;

2) obtaining L-shaped subassemblies comprising one of the connection plates 46, 47, 48 and 49 and one of the bars 30, 31, 32, 33;

3) setting an insulating sheet 62 above the face 44 of the stator pack 25 or above the last ring 55, 56, 57, 58, 59, 60, 61 or on the annular connection plate 50;

4) inserting two bars 30, 31, 32, 33 of two respective L-shaped subassemblies referred to in point 2) in respective slots 27;

7) connecting via welding the two connection plates 46, 47, 48, 49, 51, 52, 53 to the bars 30, 31, 32, 33 that have just been inserted in the respective slots so as to weld the two L-shaped subassemblies.

8) repeating the steps listed above from point 2) to point 7).

The procedure for assembling the electrical winding 26 just described has the purpose, in addition to that of reducing the number of welds to be made following upon insertion of the bars 30, 31, 32, 33, of preventing the need for a high precision, as in the case of the construction of fork-shaped subassemblies.

The assembly is completed via insertion of the rotor 4 and coupling together of the half-shells 6 and 7 via the tie-rods 35.

The Transport Vehicle

With reference to FIG. 8, the electrical machine 1 is mounted on the transport vehicle 2. In the case in point, the transport vehicle 2 comprises a chassis 74, four wheels 75, an internal-combustion engine 76, a gear change 77, a transmission 78 for transferring the motion between the gear change 77 and two of the four wheels 75, and three reversible electrical machines 1. An electrical machine 1 is connected directly to the internal-combustion engine 76 and has the function of alternator and at the same time of starting motor, whilst two other electrical machines 1 are coupled, respectively, to the two wheels 75 not connected to the transmission 78. Each electrical machine 1 is connected to a respective control unit 79, which is in turn connected to an accumulation unit 80 common to all three electrical machines 1.

Set between the electrical machine 1 and the motor 76 is a motor reducer 81, which has the function of providing a ratio of 2:1 between the r.p.m. in the electrical machine 1 and the r.p.m. of the motor 76. This transmission ratio enables optimal exploitation of the characteristics of the electrical machine 1: the power delivery by the electrical machine 1 is directly proportional to the r.p.m. of the electrical machine 1 itself, whilst its weight is directly proportional to just the maximum torque installed. The presence of a speed multiplier thus enables having very compact electrical machines given the same power delivery.

The electrical machines 1 mounted on the wheels 75 drive said wheels 75 in rotation according to the commands issued by the respective control units 79, which are in turn governed by signals issued by a device for controlling stability of a known type (not illustrated in the attached figures).

Finally, it is evident that modifications and variations can be made to the electrical machine described herein, without thereby departing from the scope of the annexed claims.

In particular, even though the present description regards a stator with twelve slots, it is understood that the invention is applicable also to stators with a greater number of slots. The present invention proves particularly advantageous owing to the fact that it exploits the space in a position corresponding to the heads to the maximum, thanks to connection plates of large dimensions that guarantee high levels of performance, but at the same time enable reduction to a minimum of the encumbrance of the electrical machine.

The invention claimed is:

1. A multiphase synchronous electrical machine for converting kinetic energy into electrical energy and electrical energy into kinetic energy on board a transport vehicle; the electrical machine comprising:
    a rotor extending along an axis, and
    a stator including:
        a stator pack having slots; and
        an electrical winding extending in part in the slots and in part at to two heads arranged on opposite sides of the stator pack, the electrical winding comprising bars housed in the slots and connected to one another at the heads; the electrical winding further comprising connection plates welded to the bars in a position corresponding to the heads, the connection plates being packed with respect to one another and to the stator pack in an axial direction, the connection plates further being shaped in such a way as to define an axial prolongation of the stator pack, each of the connection plates having:
            two substantially parallel faces set substantially transverse to the axis;
            a thickness defined in the axial direction and between the two substantially parallel faces, wherein the thicknesses of the connection plates vary between a maximum thickness at least near the stator pack and a minimum thickness at least near a free end of each of the heads; and
            an average height in a radial direction, wherein the average heights of the connection plates vary between a maximum average height at least near the free end of each of the heads and a minimum average height at least near the stator pack.

2. The electrical machine according to claim 1, wherein each connection plate is shaped like the arc of a circle and is complementary to other connection plates having substantially the same shape so as to form a ring about the axis.

3. The electrical machine according to claim 2, further comprising an annular star-centre connection plate that is set about the axis and is connected to three bars, the annular star-centre connection plate being packed to the stator pack.

4. The electrical machine according to claim 3, wherein each of the rings and the annular star-centre connection plate are separated from one another and from the stator pack by insulating sheets, provided with openings for the passage of the bars.

5. The electrical machine according to claim 1, wherein each connection plate has two seats, each of which is designed to house an end portion of a respective bar.

6. The electrical machine according to claim 5, wherein each seat is substantially C-shaped and is sized so that each connection plate extends around a respective bar for more than half of the perimeter of the cross section of the bar.

7. The electrical machine according to claim 5, wherein each connection plate includes a finger that extends in a radial direction.

8. A method for assembling a multiphase synchronous electrical machine for converting kinetic energy into electrical energy and electrical energy into kinetic energy on board a transport vehicle; wherein the electrical machine comprises a rotor, extending along an axis, and a stator, which is provided with a stator pack having slots set substantially parallel to the axis and with an electrical winding, which extends in part in the slots and in part in a position corresponding to two heads arranged on opposite sides of the stator pack and comprises bars housed in the slots and connected to one another in a position corresponding to the heads, each of the bars having two opposite end faces and a respective length, the method comprising:
    packing connection plates to one another and to the stator pack in an axial direction so as to define a prolongation of the stator pack, each of the connection plates having two substantially parallel faces set substantially traverse to the axis that define a thickness therebetween;
    arranging the bars such that each of the two opposite end faces of each of the bars are set substantially flush with one of the substantially parallel faces of a corresponding one of the connection plates packed to the stator pack; and
    welding the connection plates to the bars.

9. The method according to claim 8, wherein the bars comprise first, second, third and fourth bars; the method further comprising welding three first bars to an annular star-centre connection plate; inserting three first bars in the slots; and packing the annular star-centre connection plate to the stator pack.

10. The method according to claim 9, wherein the connection plates comprise first connection plates; the method further comprising welding each of the first connection plates to two first bars.

11. The method according to claim 8, wherein inserted in the slots of the stator pack is a number of bars equal to the number of phases of the electrical machine.

12. The method according to claim 11, wherein the number of bars is inserted in a corresponding number of slots uniformly distributed about the axis.

13. The method according to claim 8, wherein the connection plates are insulated via the interposition of insulating sheets.

14. The method according to claim 8, wherein a rotor with permanent magnets is inserted within the stator.

15. The method according to claim 14, wherein the rotor and the stator are enclosed within a casing formed by two shells which can be fitted inside one another in an axial direction; and the stator is clamped between two shoulders of the half-shells by means of tie-rods.

16. A transport vehicle comprising: a supporting chassis and at least one wheel that can turn with respect to the chassis, wherein the transport vehicle comprises an electrical machine according to claim 1 coupled to said wheel.

17. The transport vehicle according to claim 16, further comprising two wheels that can turn with respect to the chassis, and two of the electrical machines coupled to the respective wheels.

18. The vehicle according to claim 16, further comprising an internal-combustion engine designed to supply the energy necessary for driving the transport vehicle and the electrical machine connected to the internal-combustion engine and having the functions of alternator and starting motor.

19. A winding of a multiphase electric motor, comprising:
- a plurality of bars having opposite ends and arranged substantially parallel to an axis, the plurality of bars divided into groups of different lengths;
- a plurality of connection plates welded to the opposite ends of the bars and being stacked one against another in two opposite groups in an axial direction, each of the connection plates having a substantially constant thickness and an average radial height;
- wherein the thicknesses of the connection plates vary according to an axial position of the connection plates between a maximum value at least near a stator pack to a minimum value at least near a free end of a head; and
- wherein the average radial heights of the connection plates vary according to the axial position of the connection plates between a maximum average height at least near the free end of the head and a minimum average height at least near the stator pack.

* * * * *